United States Patent Office 3,748,314
Patented July 24, 1973

3,748,314
ONE PACKAGE HEAT ACTIVATABLE POLYSULFIDE CURE SYSTEM
Eugene R. Bertozzi, Yardley, Pa., assignor to Thiokol Chemical Corporation, Bristol, Pa.
No Drawing. Filed Oct. 16, 1972, Ser. No. 298,161
Int. Cl. C08g 23/00
U.S. Cl. 260—79   11 Claims

ABSTRACT OF THE DISCLOSURE

Liquid polymers containing —SH groups are cured with inorganic oxidizing agents in the presence of compounds containing at least one

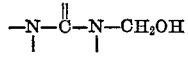

group which, upon the application of heat, accelerates the curing reaction, but is stable at room temperature.

BACKGROUND OF THE INVENTION

Field of the invention

This invention relates to novel one package curable liquid —SH containing polymer systems and to the cured products that may be produced therefrom. More particularly, this invention relates to oxidatively curable liquid —SH containing polymer systems utilizing inorganic oxidizing agents in combination with methylolated compounds containing at least one

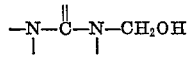

group, particularly methylolated derivatives of various ureas and melamines.

Liquid —SH containing polymers are used extensively in sealants and caulking compositions, especially in the building and automotive industries; for castings; for leather and textile impregnating agents; for adhesives, coatings, etc.

Description of the prior art

Depending upon the requirements of the particular application, and the nature of the cure systems, the components of a curable liquid —SH containing polymer system may be packaged as either one- or multi-part systems. One-part systems are those in which all the components are stored together with no appreciable reaction taking place until activated by some external influence such as heat, surface application of curing accelerators, exposure to moisture in the atmosphere, etc. Such a moisture-activatable composition is described in U.S. 3,225,017.

Two- or multi-part systems are those in which the reactive components are stored in separate packages and combined just prior to use. This type of system is most common and usually involves the storage of liquid polymer and curing agent in separate packages, as for example PbO$_2$ cured liquid polyalkylene polysulfide compositions. In another package arrangement, the polymer and curing agent may be stored in one package with a suitable accelerator being stored in a second package.

Liquid polymers containing a plurality of —SH groups may be cured with compounds which react with the —SH groups in such a way as to condense or unite lower molecular weight segments to form higher molecular weight solid materials. Commonly such polymers are oxidatively cured with organic or inorganic oxidizing agent whereby pairs of —SH groups in the liquid polymers are oxidized to —SS— groups thus promoting the formation of solid higher molecular weight materials. Often the reaction between an oxidizing agent and an —SH containing polymer is too slow for practical purposes, particularly at room temperatures, and the addition of an accelerator is required. Common accelerators which have been used in combination with oxidizing agents for the curing of liquid —SH containing polymers are elemental sulfur and alkaline compounds such as ammonia and amines, e.g. hexamethylene tetramine, 2,4,6-tris(dimethylaminomethyl)phenol, tributylamine, etc.

SUMMARY OF THE INVENTION

It has now been found that compounds containing at least one

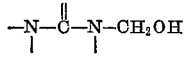

group are useful as accelerators in combination with organic and inorganic oxygen-containing curing agents for the cure of —SH containing liquid polymers. It has also been found that these types of compounds may be combined with the liquid polymers and the curing agents, to produce storage stable compositions, which upon the brief application of heat begin to cure at a rapid rate.

It is an object of this invention, therefore, to provide novel curing systems for —SH containing liquid polymers which result in storage stable compositions at room temperature, but which cure rapidly upon the brief application of heat.

DESCRIPTION OF THE PREFERRED EMBODIMENTS

The polymers suitable for use herein are, generally, polymers containing a plurality of —SH groups, such as (A) Liquid polysulfide polymercaptan polymers such as described in U.S. Pat. 2,466,963;
(B) Liquid polysulfide polymers containing a plurality of —SSH groups such as described in U.S. Ser. No. 290,637 filed June 26, 1963, now abandoned;
(C) Liquid —SH terminated polyethers such as —SH terminated polypropylene glycol as disclosed in U.S. Pat. 3,258,495;
(D) —SH terminated hydrocarbon polymers such as —SH terminated polybutadiene (Chem. and Eng. News. Apr. 4, 1966, p. 37), —SH terminated butadiene/acrylonitrile copolymers and the alkanepolythiol, aralkanepolythiol, and arenepolythiol polymers disclosed in U.S. Pats. 2,230,290, 2,436,137, and 3,243,411;
(E) Liquid —SH terminated polyurethanes such as disclosed in U.S. Pat. 3,446,780;
(F) Liquid —SH terminated poly(alkylene sulfide) polymers as disclosed in U.S. Pats. 3,056,841 and 3,070,580;
(G) Other polythiol polymers such as disclosed in U.S. Pats. 3,413,265 and 3,446,775 and U.S. patent application Ser. No. 484,118, now abandoned;

The —SH containing polymers, according to the present invention may be used singularly or in various combinations with one another.

The oxidizing agents, whose curing action on liquid —SH containing polymers may be accelerated by the compounds containing at least one

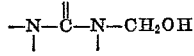

group, particularly urea and melamine derivatives in accordance with the present invention, include inorganic oxides such as ZnO, PbO, MgO, CaO, BaO, $Sb_2O_3$, $Sb_2O_5$, $As_2O_3$, $As_2O_5$, $Ca_2PbO_4$, $Cr_2O_3$, CuO, $Pb_3O_4$, FeO, $Fe_2O_3$, $Fe_3O_4$, $ZnO_2$, $MnO_2$, $Mg_2O_2$, $PbO_2$, $CaO_2$, $BaO_2$, $SeO_2$, $TeO_2$, and $Li_2O_2$; organic peroxides such as dicumyl peroxide, benzoyl peroxide, stearoyl peroxide, lauroyl peroxide, methyl ethyl ketone peroxide, urea peroxide, cumene hydroperoxide, t-butyl hydroperoxide, and t-butyl perbenzoate; chromates, and dichromates such as sodium, potassium, zinc, lead, and ammonium chromates and dichromates; permanganates such as potassium permanganate and barium permanganate; iodates such as potassium iodate; organotin compounds such as dibutyl tin oxide; organic nitro compounds such as dinitrobenzene, trinitrobenzene, and o-nitroanisole; quinoid compounds such as p-quinone dioxime, dimethylglyoxime, quinone and other dioximes; sodium carbonate peroxide; and sodium perborate. The choice of an oxidizing agent is based on its overall performance with respect to a number of requirements including (a) cost of oxidizing agent, (b) stability of oxidizing agent in the formulation, (c) rapid but controllable cure rate, (d) heat stability of the cured polymeric product, (e) lack of adverse effect on adhesion properties, and (f) elastomeric composition. The oxidizing curing agents, according to the present invention, may be used singularly or in various combinations with one another.

Compounds which contain at least one

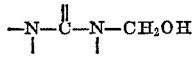

group are suitable for use herein. These include the mono- and poly-methylolated compounds prepared from urea, urea derivatives, melamine, and melamine derivatives, which include such as urea, ethyleneurea, propyleneurea, butyleneurea, thiourea, ethylenethiourea, propylenethiourea, butylenethiourea, 1,1' - methylenebisurea, 1,1'-methylenebis(3-ethylurea), 1,1'-methylenebisthiourea, 1, 1'-methylenebisethyleneurea, trimethylenetetraurea, dicyanodiamide, bis(hydroxymethylcarbamidomethyl) ether, melamine and $N,^2N^{2'}$-methylenebismelamine, and dimethylenetriurea. While thiourea and dicyanodiamide are not technically urea or melamine derivatives, they are included herein under that name.

The mono- and poly-methylolated derivatives of compounds such as the above may be prepared by the reaction of one or more of the nitrogen-atom-hydrogens with formaldehyde under acidic conditions, or in any other manner.

Accordingly, suitable compounds include monomethylolurea,
dimethylolurea,
monomethylolethyleneurea,
dimethylolethyleneurea,
monomethylolmelamine,
dimethylolmelamine,
trimethylolmelamine,
tetramethylolmelamine,
pentamethylolmelamine,
hexamethylolmelamine,
tetramethyloldimethylenetriurea,
methlenebis(methylolurea)

as well as any of the other methylol derivatives which may be prepared from the previously mention compounds which contain at least one

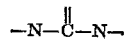

group. These compounds, according to the present invention, may be used singularly or in various combinations with one another.

The amount of oxidizing curing agent and dimethylolurea type compound or mixture of compounds employed in accordance with the present invention may vary substantially depending upon the specific combination of polymer, and curing agent employed. In general, per one hundred parts of liquid —SH containing polymer, the amount of curing agent used would be about 1 to 25 parts and the amount of accelerator used would be about 3 to 20 parts.

The ingredients of the compositions of the present invention may be combined in any of the conventional methods kown in the art such as in a three roll paint mill. If desired, and depending upon the work-like requirements for any particular use, the ingredients may be combined in a one-part system or may be separated in two or more parts so that the curing agent and/or accelerator are in one package or container.

As shown in the examples below, all of the systems of the present invention possess room temperature stability and they all cure readily upon brief application of heat.

The physical and chemical properties of the cured compositions of the present invention may be varied according to the method of application and the specific use intended. Fillers, pigments and reinforcing agents such as titanium dioxide, calcium carbonate, carbon black, silicon dioxide, clays, aluminum powder, iron oxide, rayon floc, etc., may be added if desired. In general, these additives decrease the elongation, and increase the Shore hardness, toughness, and tensile strength of the cured polymer based systems.

Other additives such as plasticizers e.g. chlorinated biphenyls and adhesive additives e.g. silane, phenolic, and epoxy resins may be used in accordance with standard practice in the art.

The following examples illustrate the present invention but are not intended as a limitation on the scope thereof.

EXAMPLE 1

In this example, dimethylolurea was added to a standard polysulfide caulk formulation and evaluated as to cure rate. The mixture contained LP®-2 liquid polysulfide polymer which may be represented by the formula:

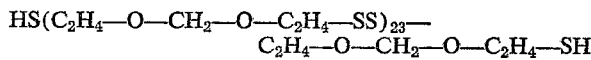

The polymer is essentially linear with about 2% crosslinking and has a molecular weight of about 4000. To 100 parts of this polymer were added 20 parts of calcium orthoplumbate (curing agent), 10 parts of dimethylolurea, and 50 parts of carbon black.

This composition was uncured after two weeks at room temperature, i.e. no change in viscosity occurred.

When this composition was heated to 270° F. for 10 minutes and then allowed to stand at room temperature a cure occurred within ½ hour.

EXAMPLE 2

The procedure of Example 1 is repeated except for varying the curing agent and the accelerator. The results are as shown in the table.

TABLE

Results of Example 2

The following basic formulation is used for this example:

| | Parts by weight |
|---|---|
| LP®-2 | 100 |
| Carbon black | 50 |
| Calcium carbonate | 20 |
| Curing agent | Varying |
| Accelerator | Varying |

| Curing agent and amount | Accelerator and amount | Room temperature stability | Curing time after activation 10 min. at 230° F. |
|---|---|---|---|
| a........ Ca₂PbO₄, 15........ | DMU, 10 | >2 weeks...... | <½ hour. |
| b........ Ca₂PbO₄, 20........ | DMTU, 15 | .....do.......... | <¼ hour. |
| c........ ZnO₂, 15........... | DMU, 10 | .....do.......... | <½ hour. |
| d........ ZnO₂, 10........... | DMEU, 10 | .....do.......... | <1 hour. |
| e........ CaO₂, 10........... | MBMU, 10 | .....do.......... | <½ hour. |
| f........ Li₂O₂, 10........... | DMM, 10 | .....do.......... | <1 hour. |
| g........ Benzoyl peroxide, 15.. | TMM, 15 | .....do.......... | Do. |
| h........ Mg₂O₂, 10........... | DMEU, 10 | .....do.......... | Do. |
| i........ PbO₂, 5............. | DMU, 5 | .....do.......... | Do. |
| j........ TeO₂, 5............. | MMU, 5 | .....do.......... | <2 hours. |

NOTE.—DMU=dimethylolurea; DMM=dimethylolmelamine; MMU=monomethylolurea; DMTU=dimethylolthiourea; DMEU=dimethylolethyleneurea; TMM=trimethylolmelamine; MBMU=methylenebis(methylolurea).

EXAMPLE 3

In this example, the type of polymer useable herein is varied while using the following standard formulation:

|  | Parts |
|---|---|
| Polymer | 100 |
| Carbon black | 40 |
| Ca₂PbO₄ curing agent | 10 |
| Dimethylolurea | 10 |

The following polymers all produce room temperature stable compositions for greater than two weeks, and cure within 1 hour after a ten minute activation cycle at 212° F.

(1) Liquid —SH terminated polypropylene glycol polymer having a molecular weight of approximately 2000–3000;

(2) LP®–31 liquid polysulfide polymer of molecular weight 7500 with the following structure;

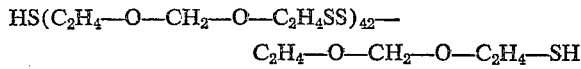

$C_2H_4$—O—$CH_2$—O—$C_2H_4$—SH (3) Liquid —SH terminated butadiene/acrylonitrile copolymer having about 24% acrylonitrile, a viscosity of 35,000 cps., and a specific gravity of 0.98 at 25° C.

What is claimed is:

1. A curable composition comprising
   (a) at least one liquid polymer containing a plurality of —SH groups;
   (b) at least one oxidizing curing agent present in about 1 to 25 parts per 100 parts of polymer; and
   (c) at least one accelerator prepared from compounds selected from the group consisting of urea, urea derivatives, melamine, melamine derivatives, thiourea, thiourea derivatives, and dicyanodiamide, and containing at least one

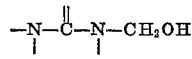

group, and present in about 3 to 20 parts per 100 parts of polymer.

2. The composition of claim 1 wherein the liquid polymer is selected from the group consisting of liquid polysulfide polymercaptan polymers, liquid —SH terminated polypropylene glycol polymers, and liquid —SH terminated butadiene/acrylonitrile copolymers.

3. The composition of claim 1 wherein the oxidizing curing agent is selected from the group consisting of inorganic metal oxides, chromates, permanganates, orthoplumbates, iodates, and perborates.

4. The composition of claim 1 wherein the accelerator is selected from the group consisting of methylolated urea, methylolated urea derivatives, methylolated melamine, and methylolated melamine derivatives.

5. The composition of claim 4 wherein the accelerator contains one methylol group.

6. The composition of claim 4 wherein the accelerator contains two methylol groups.

7. The composition of claim 4 wherein the accelerator contains more than two methylol groups.

8. The composition of claim 1 wherein the accelerator is selected from the group consisting of monomethylolurea, dimethylolurea, monomethylolethyleneurea, dimethylolethyleneurea, monomethylolpropyleneurea, dimethylolbutyleneurea, monomethylolmelamine, dimethylolmelamine, trimethylolmelamine, tetramethylolmelamine, pentamethylolmelamine, hexamethylolmelamine, tetramethyloldimethylenetriurea, monomethyloldicyanodiamide, monomethylolthiourea, and dimthylolthiourea.

9. The composition of claim 1 wherein the accelerator is selected from the group consisting of monomethylolurea, dimethylolurea, monomethylolethyleneurea dimethylolethyleneurea, dimethylolmelamine, and trimethylolmelamine.

10. The composition of claim 1 wherein the accelerator is dimethylolurea.

11. The composition of claim 10 wherein the curing agent is calcium orthoplumbate.

References Cited

UNITED STATES PATENTS 3,499,864   3/1970   Millen _____ 260—79

DONALD E. CZAJA, Primary Examiner

MELVIN I. MARQUIS, Assistant Examiner

U.S. Cl. X.R.

117—139.5 A, 141; 260—13, 37 R, 33.8 R, 79.1